(12) United States Patent
Hayase et al.

(10) Patent No.: US 12,314,145 B2
(45) Date of Patent: May 27, 2025

(54) SEMICONDUCTOR DEVICE AND LOCK STEP STARTUP CONTROL METHOD FOR SEMICONDUCTOR DEVICE

(71) Applicant: RENESAS ELECTRONICS CORPORATION, Tokyo (JP)

(72) Inventors: Kiyoshi Hayase, Tokyo (JP); Yuki Hayakawa, Tokyo (JP); Toshiyuki Kaya, Tokyo (JP); Kyohei Yamaguchi, Tokyo (JP); Takahiro Irita, Tokyo (JP); Shinichi Shibahara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 123 days.

(21) Appl. No.: 18/452,305

(22) Filed: Aug. 18, 2023

(65) Prior Publication Data
US 2024/0143465 A1 May 2, 2024

(30) Foreign Application Priority Data

Oct. 27, 2022 (JP) .................................. 2022-172398

(51) Int. Cl.
*G06F 11/16* (2006.01)
(52) U.S. Cl.
CPC ................................ *G06F 11/1629* (2013.01)
(58) Field of Classification Search
CPC ... G06F 11/1608; G06F 11/1629–1654; G06F 11/1675–1691
See application file for complete search history.

(56) References Cited

U.S. PATENT DOCUMENTS

| | | | | |
|---|---|---|---|---|
| 5,758,058 A | * | 5/1998 | Milburn | G06F 11/1675 |
| | | | | 714/E11.061 |
| 6,393,582 B1 | * | 5/2002 | Klecka | G06F 11/1658 |
| | | | | 714/10 |
| 8,458,516 B2 | | 6/2013 | Matsuyama | |
| 2006/0101306 A1 | * | 5/2006 | Needham | G06F 11/1658 |
| | | | | 714/11 |
| 2010/0218022 A1 | * | 8/2010 | Matsuyama | G06F 11/1658 |
| | | | | 713/323 |

FOREIGN PATENT DOCUMENTS

JP 2010-198131 A 9/2010

* cited by examiner

*Primary Examiner* — Gabriel Chu
(74) *Attorney, Agent, or Firm* — Rimon P.C.

(57) ABSTRACT

A semiconductor device includes first and second processor cores configured to perform a lock step operation and including first and second scan chains. The semiconductor device further includes a scan test control unit that controls a scan test of the first and second processor cores using the first and second scan chains, and a start-up control unit that outputs a reset signal for bringing the first and second processor cores into a reset state. The start-up control unit outputs an initialization scan request before the start of a lock step operation, and the scan test control unit performs an initialization scan test operation on the first and second processor cores by using an initialization pattern.

12 Claims, 7 Drawing Sheets

SEMICONDUCTOR DEVICE AND LOCK STEP STARTUP CONTROL METHOD FOR SEMICONDUCTOR DEVICE

CROSS-REFERENCE TO RELATED APPLICATIONS

The disclosure of Japanese Patent Application No. 2022-172398 filed on Oct. 27, 2022 including the specification, drawings and abstract is incorporated herein by reference in its entirety.

BACKGROUND

The present invention relates to a semiconductor device, and relates to, for example, a semiconductor device having at least two processor cores and having a lock step mode for causing the two processor cores to execute the same program, and a startup control method for the semiconductor device.

There is disclosed a technique listed below.
[Patent Document 1] Japanese Unexamined Patent Application Publication No. 2010-198131

An in-vehicle microcontroller includes a safety mechanism such as an error detection and correction circuit using an error correction code (ECC) added to an SRAM, a flash memory, or the like, or a built in self test (BIST) circuit that performs self-diagnosis. In addition, the in-vehicle microcontroller includes a safety mechanism that monitors an operation of a processor core.

As the safety mechanism that monitors the operation of the processor core, a general mechanism is a lock step mechanism. A plurality of identical processor cores are mounted on one semiconductor device, and the lock step mechanism determines whether or not the plurality of processor cores perform the same operation. For example, a lock step mode is described in Japanese Unexamined Patent Application Publication No. 2010-198131 (Patent Document 1).

SUMMARY

In the lock step mode, internal states of a plurality of processor cores need to be matched before a lock step operation is started. This is because, when the lock step operation is started in a state where the internal states of the plurality of processor cores do not match, output data of the plurality of processor cores differ and is detected as an error. In order to match the internal states of the plurality of processor cores, for example, it is conceivable to replace all flip-flops included in each of the processor cores with flip-flops having a reset function. However, if all the flip-flops are replaced with flip-flops having a reset function, the circuit area increases.

Patent Document 1 discloses a processor system including a signal line group connecting a storage element of one of the processor cores to a storage element of the other processor core. To switch to the lock step mode, the processor system described in Patent Document 1 transfers data stored in the storage element of the one processor core to the storage element of the other processor core via the signal line group. In the processor system described in Patent Document 1, the stored contents of the two processor cores are matched in this manner.

However, when the signal line group is provided between the storage elements in order to transfer the stored data, the circuit area increases.

Other problems and novel features will become apparent from the description of the present specification and the accompanying drawings.

According to an embodiment, a semiconductor device includes first and second processor cores configured to perform a lock step operation. The first and second processor cores include a first scan chain and a second scan chain, respectively. The semiconductor device further includes a scan test control unit that controls a scan test of the first and second processor cores using the first and second scan chains, and a start-up control unit that outputs a reset signal for bringing the first and second processor cores into a reset state. The start-up control unit outputs an initialization scan request before a lock step operation is started, and the scan test control unit performs an initialization scan test operation on the first and second processor cores by using an initialization pattern.

According to the embodiment, it is possible to match the stored contents of storage elements of the plurality of processor cores that perform the lock step operation while suppressing an increase in the area of a circuit.

DETAILED DESCRIPTION

Hereinafter, a semiconductor device according to an embodiment will be described in detail with reference to the drawings. In the specification and the drawings, the same components or corresponding components are denoted by the same reference signs, and redundant description is omitted. In the drawings, a configuration may be omitted or simplified for convenience of description. In addition, at least some of embodiments may be arbitrarily combined with each other.

First Embodiment

Figure 1:
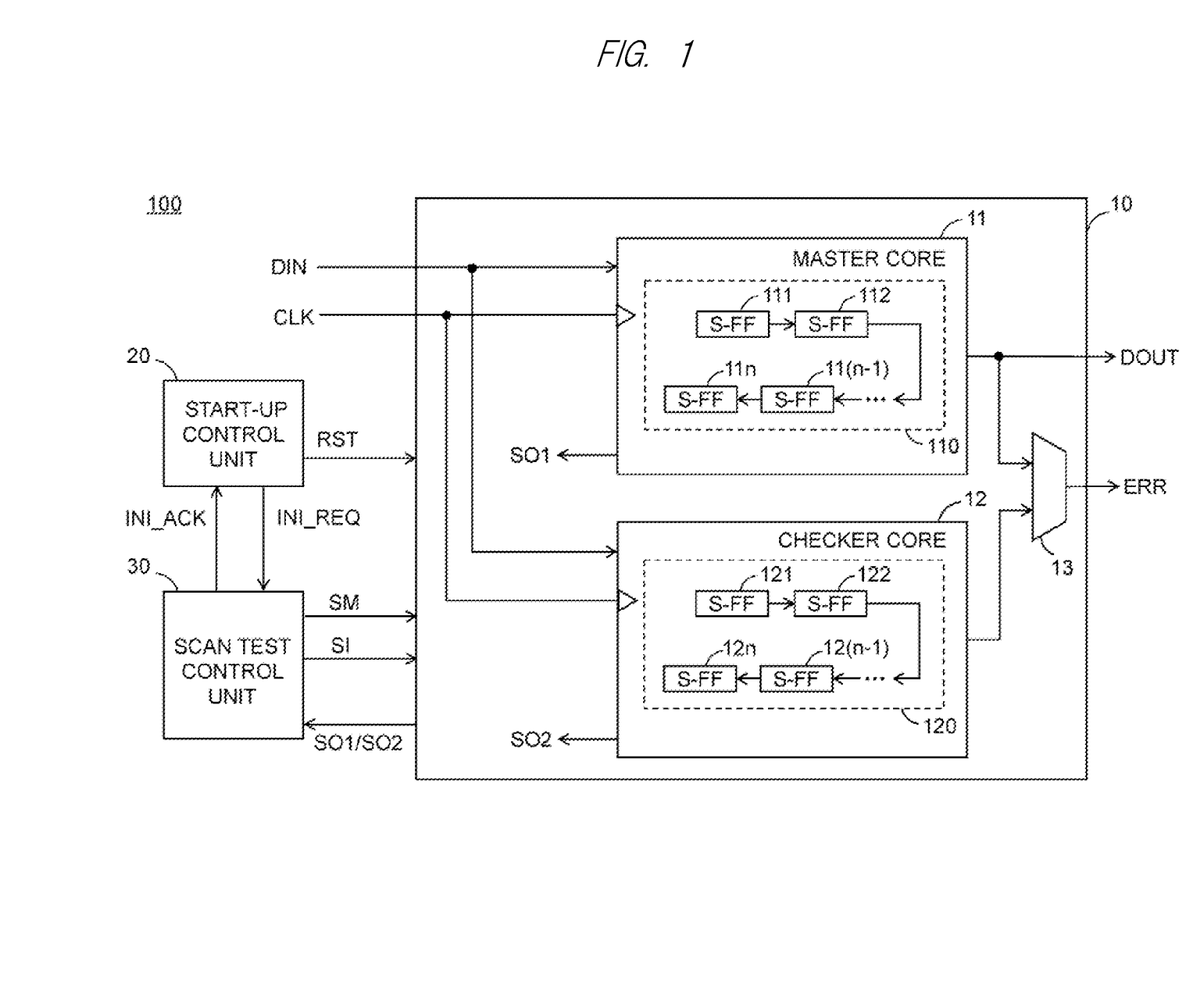
FIG. 1 is a schematic diagram illustrating an example of a configuration of a main part in a semiconductor device according to a first embodiment.

FIG. 1 is a schematic diagram illustrating an example of a configuration of a main part in a semiconductor device 100 according to a first embodiment. The configuration will be described. The semiconductor device 100 illustrated in FIG. 1 is, for example, a micro controller unit (MCU) or the like including one semiconductor chip. The semiconductor device 100 illustrated in FIG. 1 includes a processing unit 10, a start-up control unit 20, and a scan test control unit 30.

The processing unit 10 includes a first processor core 11, a second processor core 12, and a comparison unit 13. Hereinafter, the first processor core 11 is referred to as a master core 11, and the second processor core 12 is referred to as a checker core 12. The processing unit 10 further includes an internal memory (not illustrated) including a random access memory (RAM) and a flash memory. The internal memory stores, for example, a program executed by the master core 11 and the checker core 12.

The master core 11 sequentially reads (fetches) a plurality of instructions (programs) stored in the internal memory, and executes processing according to the instructions. For example, the master core 11 writes data generated by executing processing according to an instruction to the internal memory or reads data stored in the internal memory. In addition, the master core 11 outputs a result of processing according to an instruction to a peripheral circuit (not illustrated) via a bus (not illustrated).

The checker core 12 has the same configuration as the master core 11. In other words, the checker core 12 has a redundant configuration with the master core 11.

The processing unit 10 has a dual-core lock step configuration including the master core 11 and the checker core 12. The dual-core lock step configuration is a configuration in which the two processor cores execute the same processing and detect a failure by comparing the processing results. While the two processor cores are operating in the same state, a lock step operation is performed. In the present embodiment, an input data signal DIN and a clock signal CLK are commonly input to the master core 11 and the checker core 12. In the lock step operation of the present embodiment, an output result of the master core 11 is output to the peripheral circuit (not illustrated).

The master core 11 includes a scan chain (first scan chain) 110 for performing a scan test. The scan chain 110 includes n scan flip-flops 111 to 11*n*, where n is an integer of 2 or more. Similarly, the checker core 12 includes a scan chain (second scan chain) 120 for performing a scan test. The scan chain 120 also has n scan flip-flops 121 to 12*n*. The scan chain 110 and the scan chain 120 have the same configuration. Note that FIG. 1 illustrates only paths of the scan chains. Hereinafter, each of the scan flip-flops is referred to as a scan FF.

The comparison unit 13 is enabled when the lock step operation is started. The enabled comparison unit 13 compares the output of the master core 11 with the output of the checker core 12. In a case where the output of the master core 11 and the output of the checker core 12 do not match, the comparison unit 13 asserts an error signal ERR indicating that a failure has occurred in any of the processor cores.

The start-up control unit 20 detects power-on of the semiconductor device 100 and outputs a reset signal RST for bringing the processing unit 10 into a reset state for a predetermined period. The reset signal RST is commonly input to the master core 11 and the checker core 12 of the processing unit 10. When the reset signal RST is asserted, the processing unit 10 is set to a reset state. On the other hand, when the reset signal RST is negated, the reset of the processing unit 10 is released. The start-up control unit 20 includes a state machine, and outputs an initialization scan request INI_REQ to the scan test control unit 30 before the reset is released to start the lock step operation of the processing unit 10.

The scan test control unit 30 controls a scan test of the master core 11 and the checker core 12 in response to a scan test request (not illustrated) from the outside or the inside of the semiconductor device 100. Specifically, the scan test control unit 30 generates a scan mode signal SM for setting an operation mode of the scan chains 110 and 120. In addition, the scan test control unit 30 includes a pattern generation circuit (not illustrated) that generates a scan test pattern SI, and inputs the scan test pattern SI to the scan chains 110 and 120 in common. Furthermore, the scan test control unit 30 includes a detection circuit (not illustrated) that compares output results SO1 and SO2 of the scan test of the master core 11 and the checker core 12 with an expected value and detects a failure. Similarly to a general scan test for failure detection, in the scan test for failure detection of the master core 11 and the checker core 12, a scan-in operation, a capture operation, and a scan-out operation are sequentially performed.

As described above, the scan test control unit 30 receives the initialization scan request INI_REQ from the start-up control unit 20. The scan test control unit 30 controls an initialization scan test operation of the master core 11 and the checker core 12 based on the initialization scan request INI_REQ.

Figure 2:
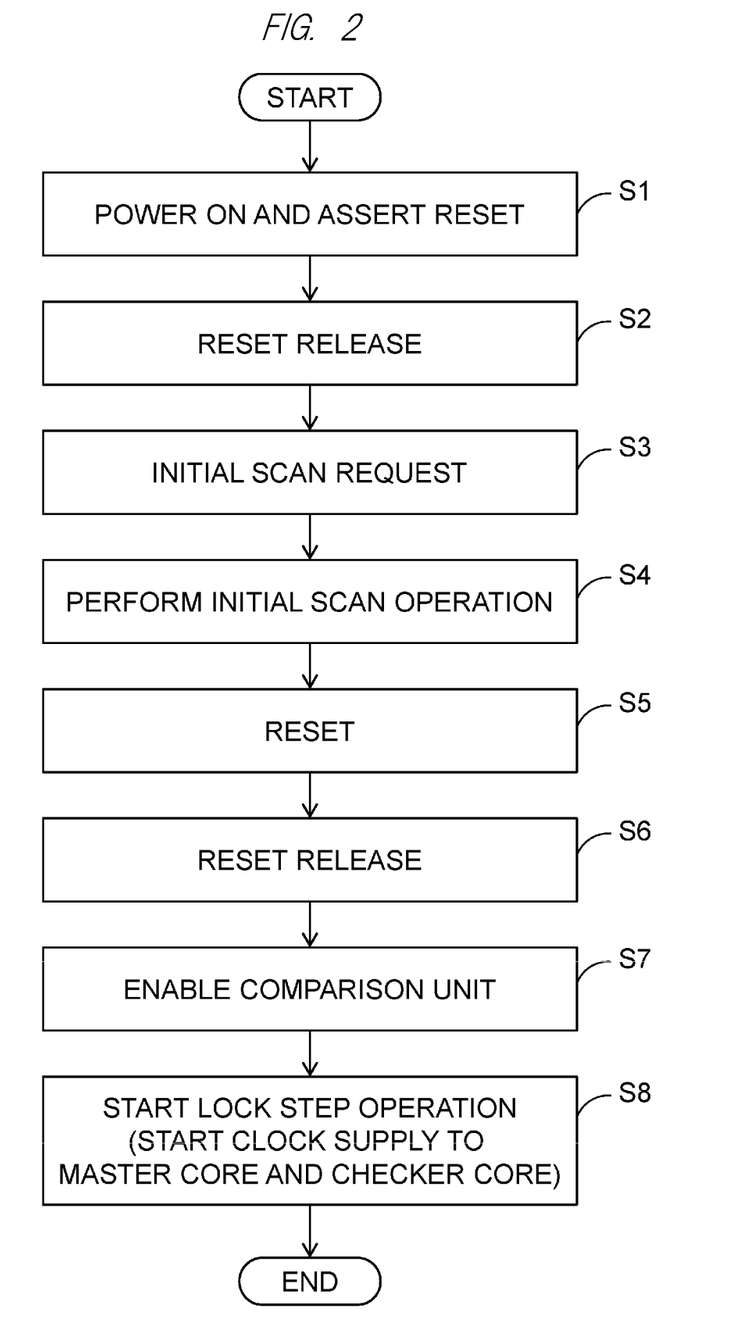
FIG. 2 is a flowchart illustrating a startup control method for the semiconductor device according to the first embodiment.

Next, a startup control method for the semiconductor device 100 will be described with reference to FIG. 2. FIG. 2 is a flowchart illustrating the startup control method for the semiconductor device 100.

When the semiconductor device 100 is powered on, the start-up control unit 20 asserts the reset signal RST for a predetermined period (step S1). The asserted reset signal RST is supplied to the processing unit 10, that is, the master core 11 and the checker core 12, and the master core 11 and the checker core 12 enter a reset state. After a lapse of the predetermined period, the start-up control unit 20 negates the reset signal RST to release the reset (step S2), and outputs an initialization scan request INI_REQ (step S3). The scan test control unit 30 receives the initialization scan request INI_REQ and performs the initialization scan test operation (step S4).

The initialization scan test operation will be described in detail. When the scan test control unit 30 receives the initialization scan request INI_REQ, the scan test control unit 30 performs the scan-in operation. For this scan-in operation, the scan test control unit 30 outputs a scan mode signal SM indicating a scan shift mode and an initialization pattern SI for the initialization scan test operation. As a result, the initialization pattern SI is scanned into the scan chains 110 and 120.

Next, the scan test control unit 30 performs the capture operation. In order to perform the capture operation, the scan test control unit 30 switches the scan mode signal SM. In the capture operation, a combination circuit (not illustrated) between the scan FFs operates similarly to the normal operation. As a result, the internal state of the master core 11 and the internal state of the checker core 12 can be matched with each other. When the capture operation is completed, the scan test control unit 30 outputs an initialization scan test operation completion notification INI_ACK to the start-up control unit 20.

When receiving the initialization scan test operation completion notification INI_ACK, the start-up control unit 20 asserts the reset signal RST again and sets the processing unit 10 to the reset state (step S5). At this time, for example, program counters included in the master core 11 and the checker core 12 are initialized, and a timer and an input/output port are initialized. Thereafter, the start-up control unit 20 negates the reset signal RST to release the reset of the processing unit 10 (step S6). Subsequently, the comparison unit 13 is enabled (step S7). For example, this enabling is implemented by asserting an enable signal (not illustrated)

of the comparison unit 13. Then, the clock signal CLK is commonly supplied to the master core 11 and the checker core 12, and the lock step operation is started (step S8).

The semiconductor device 100 according to the present embodiment performs the initialization scan test operation after the semiconductor device 100 is powered on and before the lock step operation is started. In the scan-in operation in the initialization scan test operation, the same pattern is scanned into the scan chain 110 of the master core 11 and the scan chain 120 of the checker core 12. By performing the capture operation in this state, the internal states of the master core 11 and the checker core 12 can be matched with each other.

Each of the master core 11 and the checker core 12 includes a storage element having no reset function. These storage elements not having a reset function cannot be initialized according to the reset after the semiconductor device 100 is powered on. However, according to the present embodiment, the same pattern is set in the scan chain of each core, and the capture operation is performed. As a result, values can also be set to the storage elements that do not have a reset function. Therefore, regardless of the complexity of the internal circuits of the cores, the contents stored in the storage element in the master core 11 and the contents stored in the storage element in the checker core 12 can be matched.

In addition, the initialization scan test operation in the present embodiment only needs to match the stored contents of the storage elements of the master core 11 and the checker core 12, and thus, the scan-out operation performed in the general scan test for failure detection can be omitted. In addition, in the initialization scan test operation in the present embodiment, the pattern may be shorter than a test pattern for performing a scan test for failure detection. Therefore, the initialization scan test operation can be performed in a short time. That is, it is possible to shorten the processing time for matching the internal states of the master core 11 and the checker core 12 before the start of the lock step operation.

In the present embodiment, the initialization scan test operation uses the scan chains provided in advance for performing a failure detection scan test of each core. Therefore, it is not necessary to provide a new circuit in order to match the internal states of the cores. That is, the internal states of the cores can be matched without increasing the circuit scale.

Second Embodiment

Figure 3:
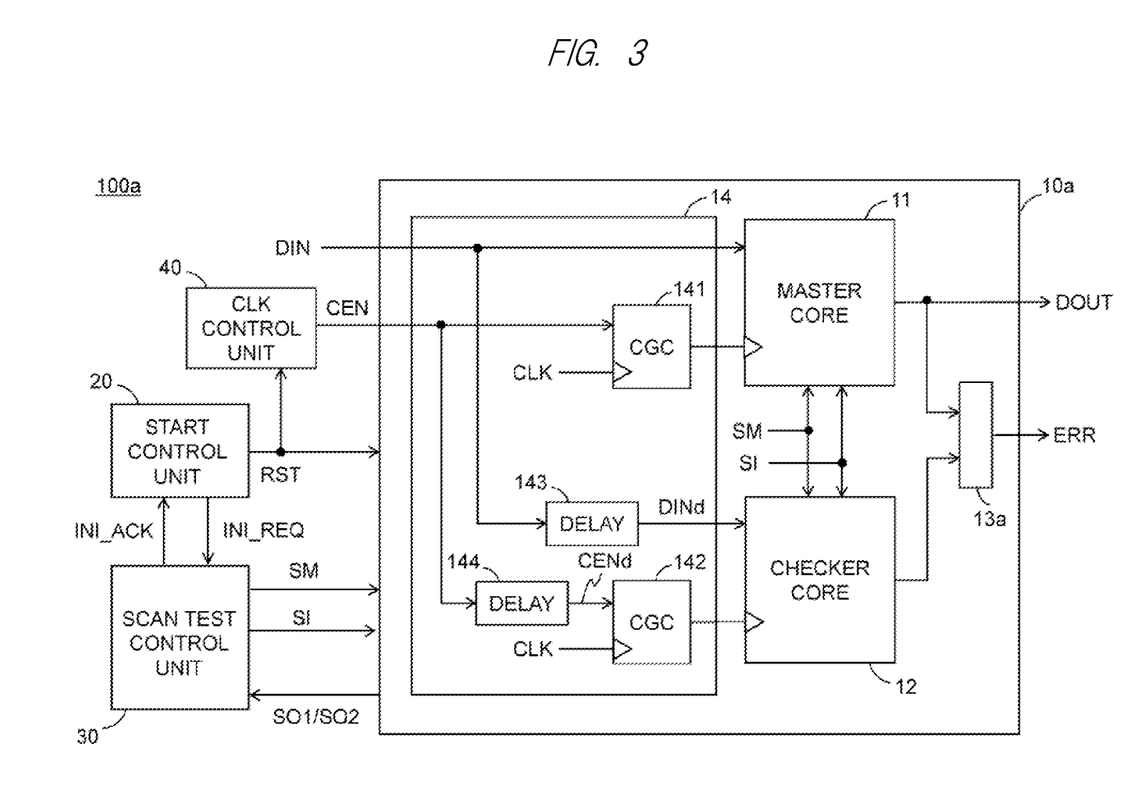
FIG. 3 is a schematic diagram illustrating an example of a configuration of a main part in a semiconductor device according to a second embodiment.

Next, a second embodiment will be described. In the second embodiment, a semiconductor device 100*a* as another form of the semiconductor device 100 according to the first preferred embodiment will be described. FIG. 3 is a schematic diagram illustrating an example of a configuration of a main part in the semiconductor device 100*a* according to the second embodiment. The configuration example illustrated in FIG. 3 is different from the configuration example illustrated in FIG. 1 in the following two points. The first difference is that a clock control unit 40 is further included. The second difference is that the processing unit 10 is replaced with a processing unit 10*a*. The processing unit 10*a* is different from the processing unit (see FIG. 1) described in the first embodiment in further including an input control unit 14. Other configurations and operations are the same as those of the semiconductor device 100 described in the first embodiment, and thus, the same configurations are denoted by the same reference signs, and repeated description is omitted.

As illustrated in FIG. 3, the semiconductor device 100*a* includes the clock control unit 40. The clock control unit 40 controls whether or not to supply a clock signal CLK to a master core 11 and a checker core 12. The clock control unit 40 receives a reset signal RST from a start-up control unit 20. When the asserted reset signal RST is input to the clock control unit 40, the clock control unit 40 negates a clock enable signal CEN and stops clock supply to the master core 11 and the checker core 12. On the other hand, when the reset is released and the reset signal RST is negated, the clock control unit 40 asserts the clock enable signal CEN and starts clock supply to the master core 11 and the checker core 12.

The processing unit 10*a* has a clock delay type dual-core lock step configuration. The processing unit 10*a* includes an input control unit 14 in addition to the master core 11 and the checker core 12. The input control unit 14 includes clock gating cells (hereinafter, referred to as CGCs) 141 and 142 and delay circuits 143 and 144. In addition, the processing unit 10*a* includes a comparison unit 13*a* instead of the comparison unit 13 described in the first embodiment.

The CGC 141 receives the clock signal CLK and supplies the clock signal CLK to the master core 11 or stops the supply of the clock signal CLK based on the clock enable signal CEN. The CGC 142 controls the supply of the clock signal CLK to the checker core 12 based on a clock enable signal CENd.

The delay circuit 143 delays an input data signal DIN by a predetermined number of clock cycles. Hereinafter, the input data signal DIN delayed by the delay circuit 143 is referred to as an input data signal DINd. The input data signal DINd is supplied to the checker core 12.

The delay circuit 144 delays the clock enable signal CEN by a predetermined number of clock cycles. Hereinafter, the clock enable signal CEN delayed by the delay circuit 144 is referred to as a clock enable signal CENd. The clock enable signal CENd is supplied to the CGC 142.

In this manner, the checker core 12 receives the input data signal DIN after the master core 11 receives the input data signal DIN. In addition, due to the clock enable signal CENd, the clock signal CLK is supplied to the checker core 12 after being supplied to the master core 11. That is, the checker core 12 executes the same processing as that of the master core 11 with a delay of a predetermined number of clock cycles. By delaying the processing timing of the checker core 12, peaks of power consumption and the like can be dispersed.

Figure 4:
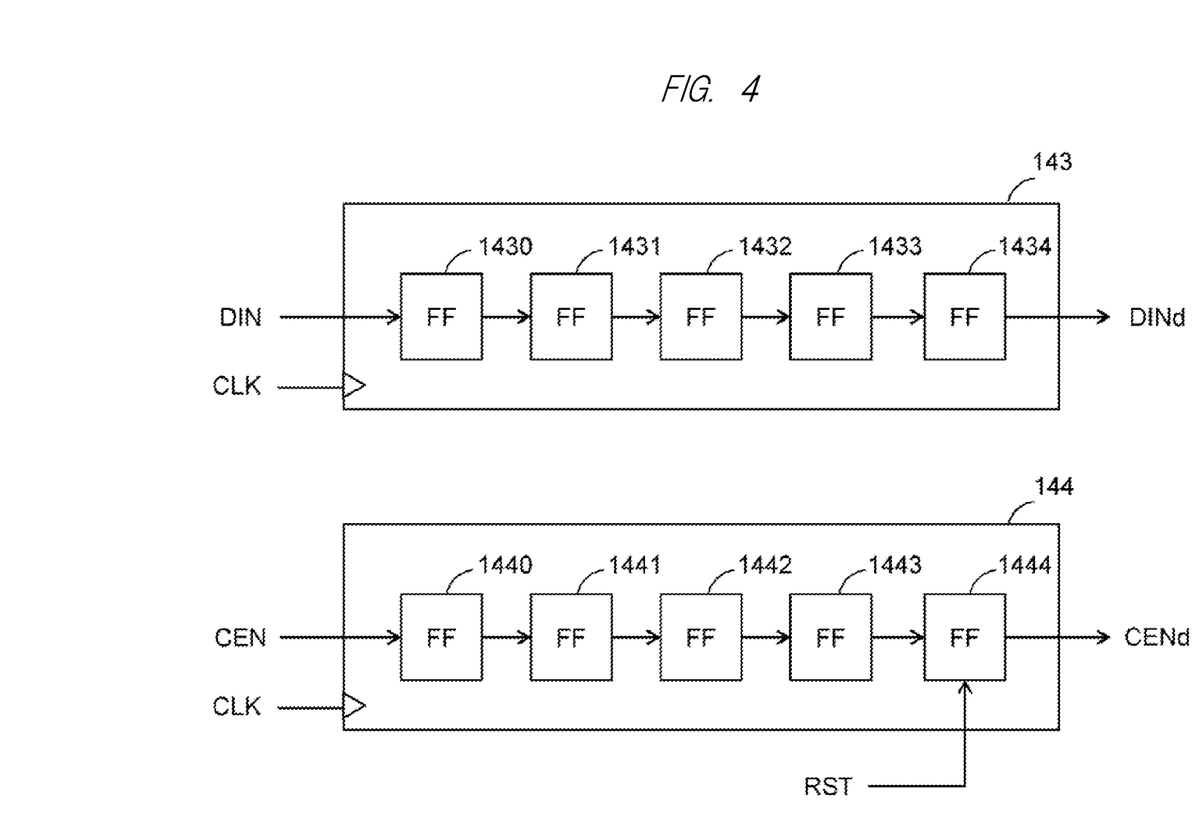
FIG. 4 is a block diagram illustrating a configuration of a delay circuit according to the second embodiment.

Next, the configurations of the delay circuits 143 and 144 will be described. FIG. 4 is a block diagram illustrating an example of the configurations of the delay circuits 143 and 144 according to the present embodiment.

The delay circuit 143 includes a plurality of flip-flops (FFs) 1430 to 1434. The plurality of flip-flops 1430 to 1434 are connected in series and function as a shift register using the clock signal CLK as a shift clock. In the present embodiment, an example is shown in which the delay circuit 143 outputs the input data signal DINd obtained by delaying the input data signal DIN by 5 clock cycles, but the present invention is not limited thereto.

The delay circuit 144 includes a plurality of flip-flops (FFs) 1440 to 1444. The plurality of flip-flops 1440 to 1444 are connected in series and function as a shift register using the clock signal CLK as a shift clock. In the present embodiment, the delay circuit 144 outputs the clock enable signal CENd obtained by delaying the clock enable signal CEN by the same number of clock cycles (5 clock cycles) as that in the delay circuit 143. The delay circuit 144 has substantially the same configuration as the delay circuit 143, but is different from the delay circuit 143 in that the flip-flop 1444 at the last stage has a reset function. The flip-flop 1444 having the reset function is reset by the reset signal RST generated by the start-up control unit 20.

Figure 5:
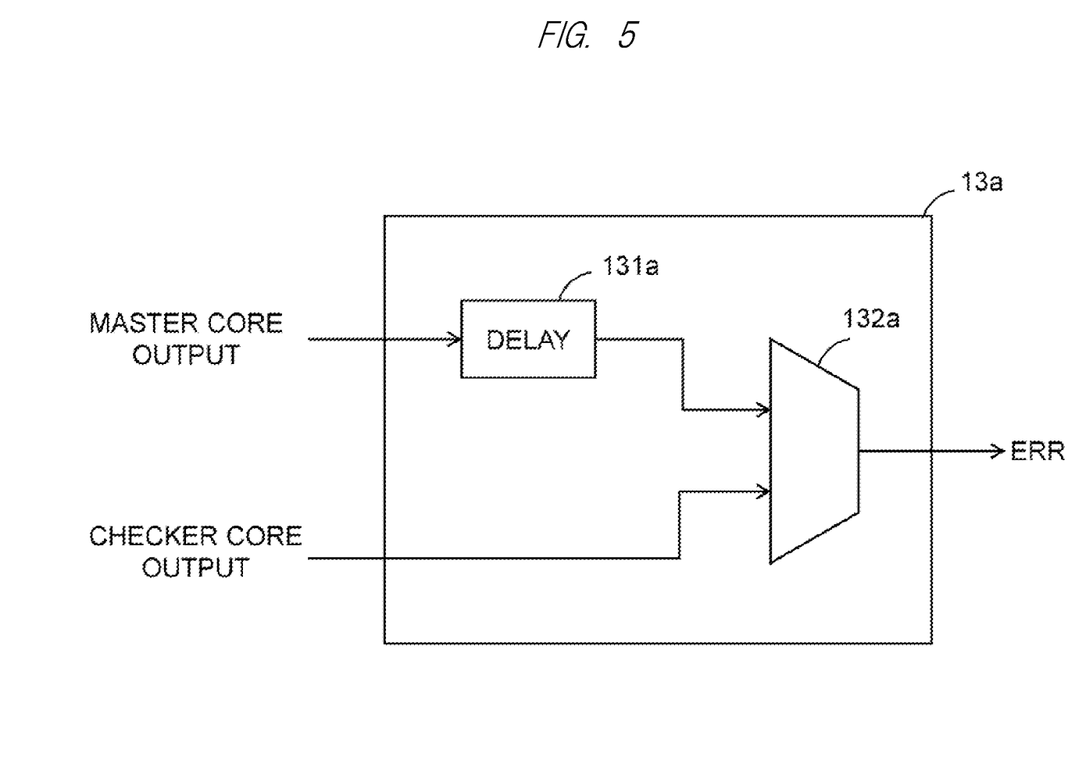
FIG. 5 is a block diagram illustrating a configuration of a comparison unit according to the second embodiment.

FIG. 5 is a block diagram illustrating an example of a configuration of the comparison unit 13*a* according to the present embodiment. The comparison unit 13*a* includes a delay circuit 131*a* and a comparison circuit 132*a*. The delay circuit 131*a* delays the output of the master core 11 by the same number of clock cycles as that in the delay circuit 143. The delay circuit 131*a* may have a configuration equivalent to that of the delay circuit 143. The comparison unit 13*a* compares the output of the master core 11 delayed by the delay circuit 131*a* with the output of the checker core 12. As a result, the outputs based on the same processing of the master core 11 and the checker core 12 are compared. In a case where the comparison result does not indicate a match between the outputs, the comparison unit 13*a* asserts an error signal ERR indicating that a failure has occurred in any of the processor cores.

Similarly to the first embodiment, the semiconductor device 100*a* according to the second embodiment uses scan chains of the master core 11 and the checker core 12 to perform an initialization scan test operation for matching the internal states of the master core 11 and the checker core 12 before starting the lock step operation.

Figure 6:
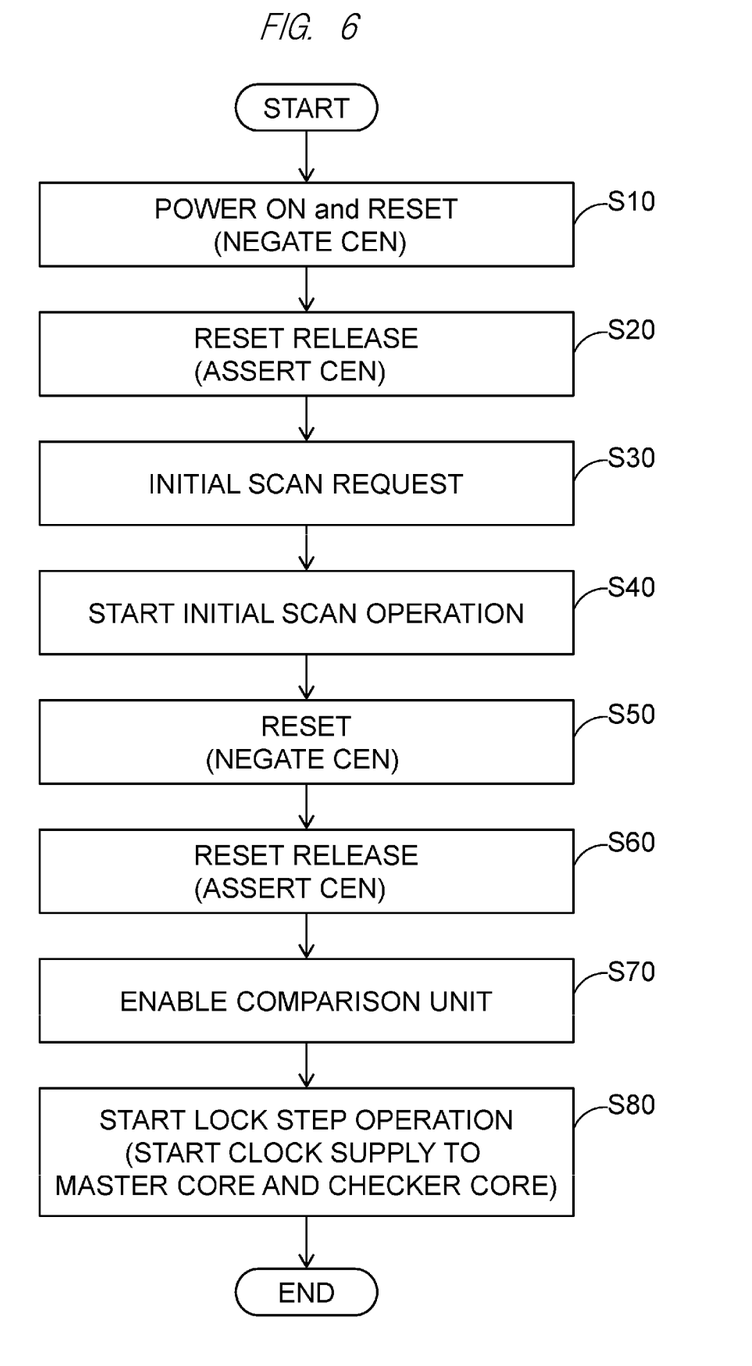
FIG. 6 is a flowchart illustrating a startup control method for the semiconductor device according to the second embodiment.
Figure 7:
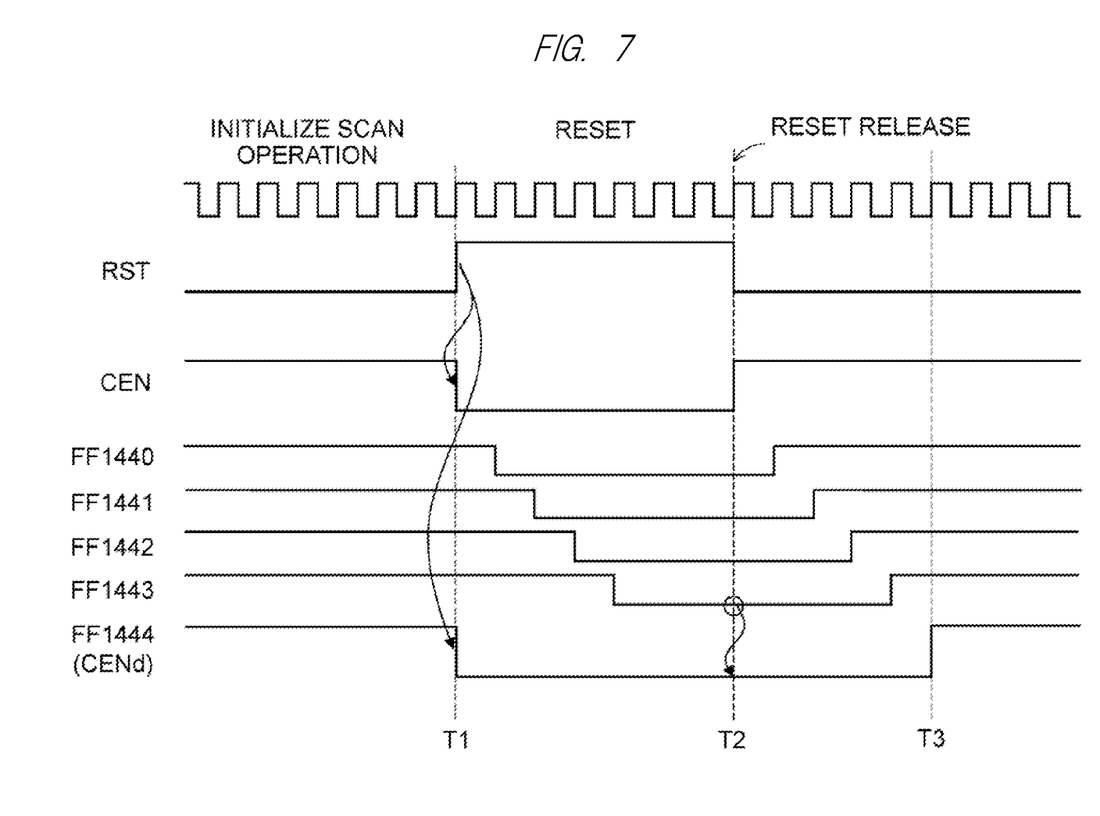
FIG. 7 is a waveform chart illustrating internal waveforms during startup control for the semiconductor device according to the second embodiment.

With reference to FIGS. 6 and 7, a startup control method for the semiconductor device 100*a* according to the second embodiment will be described. FIG. 6 is a flowchart illustrating the startup control method for the semiconductor device 100*a*. FIG. 7 is a waveform chart illustrating internal waveforms during startup control for the semiconductor device 100*a*.

When the semiconductor device 100*a* is powered on, the start-up control unit 20 asserts the reset signal RST for a predetermined period (step S10). The clock control unit 40 negates the clock enable signal CEN according to the asserted reset signal RST. The asserted reset signal RST is supplied to the processing unit 10*a*, that is, the master core 11 and the checker core 12, and the master core 11 and the checker core 12 enter a reset state.

After a lapse of the predetermined period, the start-up control unit 20 negates the reset signal RST to release the reset (step S20). When the reset signal RST is negated, the clock control unit 40 asserts the clock enable signal CEN. Based on the asserted clock enable signal CEN, the CGCs 141 and 142 start supplying the clock signal CLK to the master core 11 and the checker core 12, respectively.

Subsequently, the start-up control unit 20 outputs an initialization scan request INI_REQ (step S30). The scan test control unit 30 receives the initialization scan request INI_REQ and performs the initialization scan test operation (step S40). Since the initialization scan test operation in the present embodiment is similar to the initialization scan test operation described in the first embodiment, detailed description thereof will be omitted. When the initialization scan test operation is completed, the scan test control unit 30 notifies the start-up control unit 20 of an initialization scan test operation completion notification INI_ACK.

When receiving the initialization scan test operation completion notification INI_ACK, the start-up control unit 20 asserts the reset signal RST again (step S50). As illustrated in FIG. 7, when the reset signal RST is asserted at time T1, the clock control unit 40 negates the clock enable signal CEN. In FIG. 7, the asserted signal indicates the high level, and the negated signal indicates the low level, but the present invention is not limited thereto. The CGC 141 stops the supply of the clock signal CLK to the master core 11 on the basis of the negated clock enable signal CEN. In this case, the CGC 142 receives the negated clock enable signal CENd via the delay circuit 144. However, among the plurality of flip-flops included in the delay circuit 144, the flip-flop 1444 at the last stage has the reset function. Therefore, as illustrated in FIG. 7, the clock enable signal CENd supplied to the CGC 142 is negated at the same timing (time T1) as the clock enable signal CEN supplied to the CGC 141. As a result, the numbers of clocks input to the master core 11 and the checker core 12 can be equalized from the start to the completion of the initialization scan test operation. That is, a state in which the internal states of the master core 11 and the checker core 12 match is maintained.

Thereafter, the start-up control unit 20 negates the reset signal RST to release the reset (step S60). In response to the release of the reset, the clock control unit 40 asserts the clock enable signal CEN (at time T2 in FIG. 7). The supply of the clock signal CLK to the master core 11 is started on the basis of the clock enable signal CEN. Furthermore, the supply of the clock signal CLK to the checker core 12 is started on the basis of the signal (clock enable signal CENd) obtained by delaying the clock enable signal CEN (at time T3 in FIG. 7). Subsequently, the comparison unit 13*a* is enabled (step S70), and the lock step operation is started (step S80).

As described above, in FIG. 7, the clock control unit 40 resets the clock enable signal CEN according to the reset signal RST output after the start-up control unit 20 performs the initialization scan test operation. Specifically, the clock control unit 40 negates/asserts the clock enable signal CEN in response to assertion/negation of the reset signal RST. Furthermore, the delay circuit 144 resets the clock enable signal CENd on the basis of the reset signal RST. Specifically, the delay circuit 144 negates the clock enable signal CENd in response to assertion of the reset signal RST, and asserts the clock enable signal CENd after a delay of a predetermined number of cycles from the negation of the reset signal RST.

In the present embodiment, in order to equalize the numbers of clocks supplied to the master core 11 and the checker core 12 in the initialization scan test operation, the flip-flop at the last stage in the delay circuit 144 has the reset function. All the flip-flops included in the delay circuit 144 can be flip-flops having a reset function only in order to equalize the numbers of clocks supplied to the cores in the initialization scan test operation. In this case, there is a possibility that the clock enable signal CENd output from the delay circuit 144 may become unstable when the reset is released. Therefore, the numbers of clocks given to the cores before the start of the lock step operation are different, and as a result, values set in storage circuits at the time of starting the lock step operation may not match between the master core 11 and the checker core 12. However, in the present embodiment, since only the flip-flop 1444 at the last stage in the delay circuit 144 has the reset function, when the reset is released, the flip-flop 1444 takes in and outputs a value output from the flip-flop 1443 in the previous stage (see the time T2 in FIG. 7). Therefore, the clock enable signal CENd does not become unstable when the reset is released.

According to the second embodiment, even in the processing unit 10*a* having the clock delay type dual lock step configuration, by performing the initialization scan test operation on the two cores in the processing unit, the internal states of the cores before the start of the lock step operation can be matched with each other.

In the second embodiment, only the flip-flop 1444 at the last stage in the delay circuit 144 is configured as a flip-flop having a reset function, but a plurality of flip-flops in the delay circuit 144 may be configured as flip-flops having a reset function as long as the clock enable signal CENd output from the delay circuit 144 does not become unstable when the reset is released.

In each of the first and second embodiments, the initialization scan test operation includes the scan-in operation and the capture operation. Since the initialization scan test operation is not intended for failure detection, the scan-out operation is not essential. However, in the initialization scan test operation, the scan-out operation may be performed following the capture operation.

In addition to the lock step operation mode in which the master core 11 and checker core 12 included in the semiconductor device perform the same process, the semiconductor device may have a free-step operation mode in which the master core 11 and the checker core 12 perform different processes. When the free-step operation mode is switched to the lock step operation mode, the initialization scan test operation described in the present embodiment may be performed in order to match the internal states of the two processor cores.

Although the invention made by the present inventors has been specifically described based on the embodiments, the present invention is not limited to the above embodiments, and it goes without saying that various modifications can be made without departing from the gist of the present invention.

What is claimed is:

1. A semiconductor device comprising:
   first and second processor cores configured to perform a lock step operation;
   a first scan chain included in the first processor core;
   a second scan chain included in the second processor core;
   a scan test control unit that controls a scan test of the first and second processor cores using the first and second scan chains; and
   a start-up control unit that outputs a reset signal for bringing the first and second processor cores into a reset state,
   wherein the start-up control unit generates an initialization scan request before releasing the reset states of the first and second processor cores to start the lock step operation, and
   wherein the scan test control unit performs, based on the initialization scan request, an initialization scan test operation on the first and second processor cores by using an initialization pattern.

2. The semiconductor device according to claim 1,
   wherein the start-up control unit outputs the initialization scan request after the semiconductor device is powered on and before the lock step operation is started.

3. The semiconductor device according to claim 1,
   wherein the scan test control unit is further configured to control a failure detection scan test, and
   wherein the scan test control unit
   sequentially performs a scan-in operation, a capture operation, and a scan-out operation in the failure detection scan test, and
   performs the scan-in operation and the capture operation in the initialization scan test operation, and issues an initialization scan test operation completion notification after the capture operation.

4. The semiconductor device according to claim 3,
   wherein the start-up control unit releases the reset states of the first and second processor cores based on the initialization scan test operation completion notification.

5. The semiconductor device according to claim 1, further comprising:
   a first clock gating cell that controls clock supply to the first processor core based on a first clock enable signal;
   a first delay circuit that receives an input data signal input to the first processor core, delays the input data signal by a predetermined number of cycles, and inputs the delayed input data signal to the second processor core;
   a second delay circuit that delays the first clock enable signal provided to the first clock gating cell by the predetermined number of cycles so as to generate a second clock enable signal; and
   a second clock gating cell that controls clock supply to the second processor core based on the second clock enable signal.

6. The semiconductor device according to claim 5, further comprising:
   a clock control unit that generates the first clock enable signal,
   wherein the clock control unit resets the first clock enable signal according to a reset signal output after the start-up control unit performs the initialization scan test operation, and
   wherein the second delay circuit resets the second clock enable signal based on the reset signal.

7. The semiconductor device according to claim 5,
   wherein the second delay circuit includes a plurality of flip-flops connected in series, and
   wherein a flip-flop at a last stage among the plurality of flip-flops has a reset function and is reset according to the reset signal from the start-up control unit.

8. A startup control method for a semiconductor device, the semiconductor device having first and second processor cores configured to perform a lock step operation, the first processor core including a first scan chain, and the second processor core including a second scan chain, the startup control method comprising:
   performing an initialization scan test operation on the first and second processor cores by using an initialization pattern after the semiconductor device is powered on; and
   starting the lock step operation on the first and second processor cores after the initialization scan test operation is performed.

9. The startup control method according to claim 8,
   wherein the initialization scan test operation includes:
   scanning the initialization pattern into the first and second scan chains;
   performing a capture operation after the scan-in; and
   issuing an initialization scan test operation completion notification after completion of the capture operation.

10. The startup control method according to claim 9, comprising:
    resetting the first and second processor cores according to the initialization scan test operation completion notification; and
    starting the lock step operation after the reset is released.

11. The startup control method according to claim 10, wherein the semiconductor device further includes: a startup control unit that outputs a reset signal for bringing the first and second processor cores into a reset state; a clock control unit that generates a first clock enable signal; a first clock gating cell that controls clock supply to the first processor core based on the first clock enable signal; a delay circuit that generates a second clock enable signal by delaying the first clock enable signal provided to the first clock gating cell by a predetermined number of cycles; and a second clock gating cell that controls clock supply to the second processor core based on the second clock enable signal, and wherein the first clock enable signal and the second clock enable signal are reset based on the reset signal from the start-up control unit.

12. The startup control method according to claim 11,
wherein the delay circuit includes a plurality of flip-flops connected in series, and
wherein a flip-flop at a last stage among the plurality of flip-flops has a reset function.

\* \* \* \* \*